(12) United States Patent
Kim et al.

(10) Patent No.: US 10,884,655 B2
(45) Date of Patent: Jan. 5, 2021

(54) STORAGE MODULES, METHODS OF OPERATING A STORAGE MODULE, AND METHODS OF OPERATING A HOST CONTROLLING A STORAGE MODULE

(71) Applicant: Samsung Electronics Co., Ltd., Suwon-si (KR)

(72) Inventors: Minsu Kim, Seongnam-si (KR); Tae-Kyeong Ko, Hwaseong-si (KR); Dae-Jeong Kim, Seoul (KR); Do-Han Kim, Hwaseong-si (KR); Sung-Joon Kim, Hwaseong-si (KR); Wonjae Shin, Seoul (KR); Kwanghee Lee, Hwaseong-si (KR); Changmin Lee, Hwaseong-si (KR); Insu Choi, Hwaseong-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/386,645

(22) Filed: Apr. 17, 2019

(65) Prior Publication Data
US 2020/0133565 A1 Apr. 30, 2020

(30) Foreign Application Priority Data

Oct. 24, 2018 (KR) ........................ 10-2018-0127261

(51) Int. Cl.
| | |
|---|---|
| *G06F 3/06* | (2006.01) |
| *G06F 12/0891* | (2016.01) |
| *G06F 12/1009* | (2016.01) |
| *G06F 12/02* | (2006.01) |

(52) U.S. Cl.
CPC .......... *G06F 3/0656* (2013.01); *G06F 3/0619* (2013.01); *G06F 3/0679* (2013.01); *G06F 12/0238* (2013.01); *G06F 12/0891* (2013.01); *G06F 12/1009* (2013.01)

(58) Field of Classification Search
None
See application file for complete search history.

(56) References Cited

U.S. PATENT DOCUMENTS

| | | | |
|---|---|---|---|
| 9,189,387 B1 | 11/2015 | Taylor | |
| 9,478,274 B1 | 10/2016 | Michaud | |
| 9,779,016 B1 | 10/2017 | Shen | |
| 9,852,060 B2 | 12/2017 | Berke | |
| 2014/0101370 A1 | 4/2014 | Chu | |

(Continued)

FOREIGN PATENT DOCUMENTS

KR 101104361 1/2012

*Primary Examiner* — Edward J Dudek, Jr.
*Assistant Examiner* — Ralph A Verderamo, III
(74) *Attorney, Agent, or Firm* — Myers Bigel, P.A.

(57) ABSTRACT

A storage module includes a dynamic random access memory (DRAM) device, a nonvolatile memory device, and a high-speed buffer memory. An method of operating the storage module includes copying target data stored in the nonvolatile memory device to the high-speed buffer memory in response to an external device entering a page fault mode, receiving a first refresh command from the external device, and, in response to the first refresh command, performing a first refresh operation associated with the DRAM device and moving the target data copied to the high-speed buffer memory to the DRAM device during a first refresh reference time.

19 Claims, 14 Drawing Sheets

(56) References Cited

U.S. PATENT DOCUMENTS

| | | |
|---|---|---|
| 2014/0237205 A1 | 8/2014 | Takefman |
| 2017/0046259 A1 | 2/2017 | McKean |
| 2017/0300419 A1 | 10/2017 | Yang |
| 2018/0011714 A1 | 1/2018 | Han |
| 2019/0243788 A1* | 8/2019 | Stonelake ........... G06F 12/1009 |

* cited by examiner

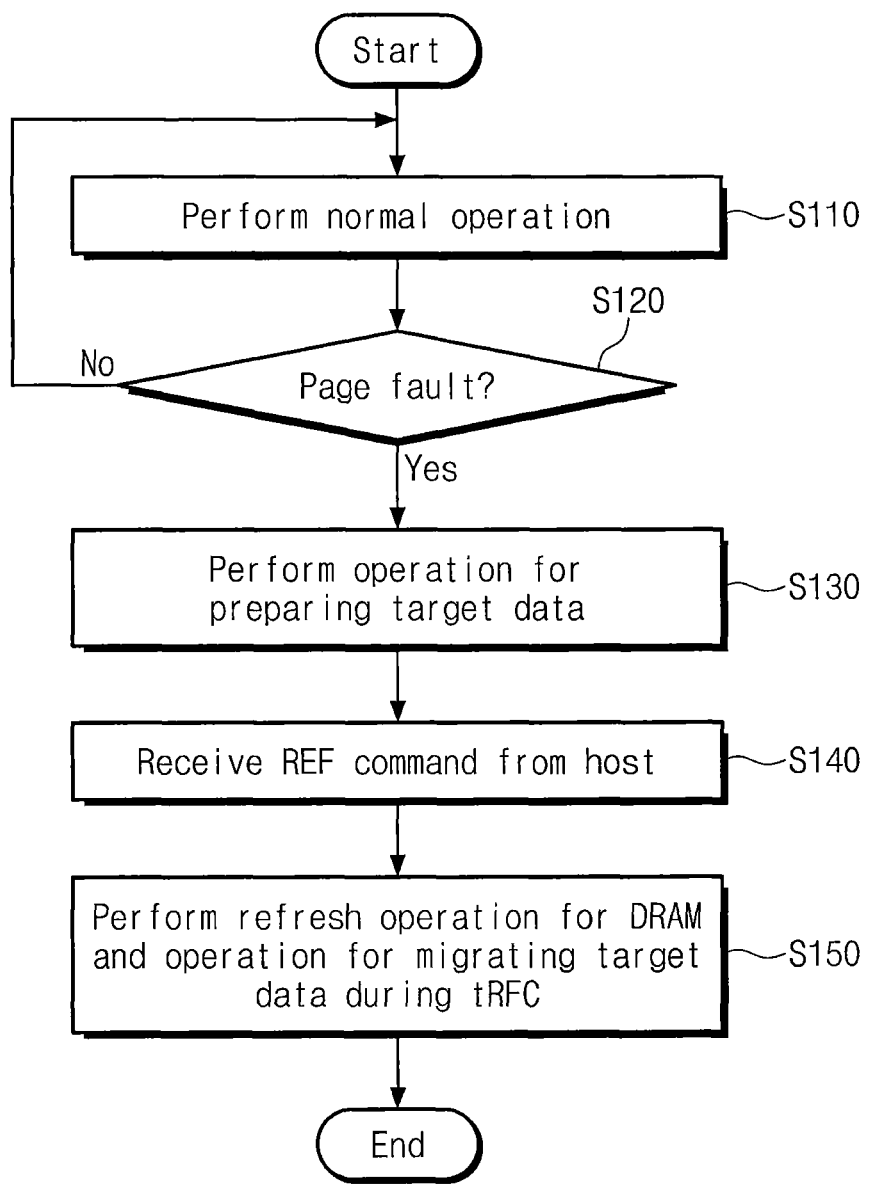

[Normal Operation]

[Page Fault Mode]

STORAGE MODULES, METHODS OF OPERATING A STORAGE MODULE, AND METHODS OF OPERATING A HOST CONTROLLING A STORAGE MODULE

CROSS-REFERENCE TO RELATED APPLICATION

This application claims priority under 35 U.S.C. § 119 to Korean Patent Application No. 10-2018-0127261 filed on Oct. 24, 2018, in the Korean Intellectual Property Office, the entire contents of which are incorporated by reference herein.

TECHNICAL FIELD

Embodiments of the inventive concepts relate to semiconductor memory, and more particularly, relate to storage modules, methods of operating the storage modules, and methods of operating a host controlling the storage modules.

BACKGROUND

Semiconductor memories may be classified as a volatile memory device, in which stored data disappears when power is turned off, such as, for example, a static random access memory (SRAM) or a dynamic random access memory (DRAM), and as a nonvolatile memory device, in which stored data is retained even when power is turned off, such as, for example, a flash memory device, a phase-change RAM (PRAM), a magnetic RAM (MRAM), a resistive RAM (RRAM), or a ferroelectric RAM (FRAM).

Devices such as a nonvolatile dual in-line memory module (NVDIMM), which uses a nonvolatile memory (e.g., a flash memory), are being developed. Since the NVDIMM may be connected to a DIMM socket directly connected with a processor of a system, the NVDIMM may provide a fast operating speed. However, since the nonvolatile memory used in the NVDIMM provides a relatively slow operating speed compared with an interface speed between the processor and the memory module, a delay time increases upon accessing data stored in the nonvolatile memory.

SUMMARY

Embodiments of the inventive concepts provide storage modules with improved performance, a method of operating the storage module, and a method of operating a host controlling the storage module.

According to an example embodiment, a storage module includes a dynamic random access memory (DRAM) device, a nonvolatile memory device, and a high-speed buffer memory. An method of operating the storage module includes copying target data stored in the nonvolatile memory device to the high-speed buffer memory responsive to an external device entering a page fault mode, receiving a first refresh command from the external device, and, in response to the first refresh command, performing a first refresh operation associated with the DRAM device and moving the target data copied to the high-speed buffer memory to the DRAM device during a first refresh reference time.

According to an example embodiment, a storage module includes a dynamic random access memory (DRAM) device that communicates with an external device through a first interface, a nonvolatile memory device, a high-speed buffer memory, and a controller that is coupled to the first interface and configured to copy target data from the nonvolatile memory device to the high-speed buffer memory responsive the external device entering a page fault mode. During a first refresh time in response to a first refresh command from the external device entering the page fault mode, the DRAM device is configured to perform a refresh operation and the controller is configured to move the target data copied to the high-speed buffer memory to the DRAM device. The first refresh reference time is longer than a minimum time required for the DRAM device to perform the refresh operation.

According to an example embodiment, a host is configured to control a storage module including a dynamic random access memory (DRAM) device and a nonvolatile memory device, and an method of operating the host includes entering a page fault mode when target data are absent from the DRAM device, changing a refresh reference time from a first reference time to a second reference time in response to entering the page fault mode, the second reference time being longer than the first reference time, transmitting a refresh command to the storage module, and providing a valid command to the storage module after the second reference time elapses from a time point when the refresh command is transmitted.

BRIEF DESCRIPTION OF THE FIGURES

The above and other objects and features of the inventive concepts will become apparent by describing in detail example embodiments thereof with reference to the accompanying drawings.

FIG. 2 is a flowchart illustrating an operation of a storage module of FIG. 1.

DETAILED DESCRIPTION

Example embodiments of the inventive concepts will now be described more fully with reference to the accompanying drawings, in which example embodiments are shown.

Figure 1:
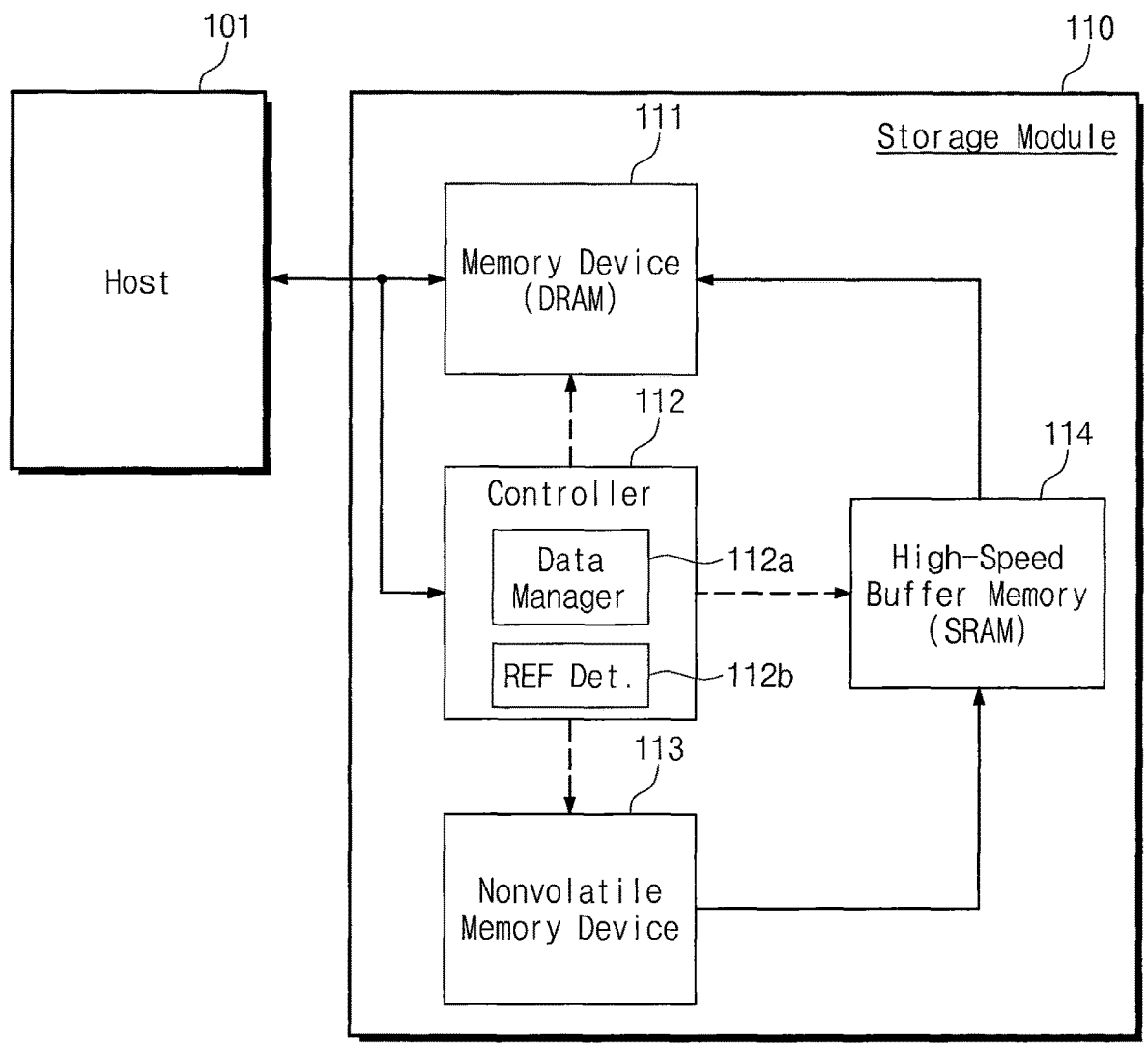
FIG. 1 is a block diagram illustrating a computing system according to an embodiment of the inventive concepts.

FIG. 1 is a block diagram illustrating a computing system according to an embodiment of the inventive concepts. Referring to FIG. 1, a computing system 100 may include a host 101 and a storage module 110. In an example embodiment, the computing system 100 may be implemented, for example, in the form of a portable communication terminal, a personal digital assistant (PDA), a portable multimedia player (PMP), a smartphone, in the form of a wearable device, and/or in the form of a computing system such as a personal computer, a server, a workstation, or a notebook computer.

The host 101 may store data to the storage module 110 or may read data stored in the storage module 110. In an example embodiment, the host 101 may be a central processing unit (CPU) or an application processor (AP) included in the computing system 100.

The storage module 110 may include a memory device 111, a controller 112, a nonvolatile memory device 113, and a high-speed buffer memory 114. Under control of the host 101, the memory device 111 may store data and/or may output the stored data.

The controller 112 may control the memory device 111, the nonvolatile memory device 113, and/or the high-speed buffer memory 114 included in the storage module 110. For example, the controller 112 may move/copy data stored in the nonvolatile memory device 113 to the high-speed buffer memory 114, and/or may move/copy data stored in the high-speed buffer memory 114 to the nonvolatile memory device 113. In some embodiments, the controller 112 may move/copy data stored in the high-speed buffer memory 114 to the memory device 111, and/or may move/copy data stored in the memory device 111 to the high-speed buffer memory 114.

The nonvolatile memory device 113 may operate under control of the controller 112. For example, the nonvolatile memory device 113 may be configured to provide data stored therein to the high-speed buffer memory 114 and/or to store data from the high-speed buffer memory 114, under control of the controller 112. In an example embodiment, the nonvolatile memory device 113 may be a NAND flash memory. However, the inventive concepts are not limited thereto. For example, the nonvolatile memory device 113 may be implemented with various nonvolatile memory devices such as a resistive RAM (ReRAM), a phase change RAM (PRAM), and a magnetic RAM (MRAM).

The high-speed buffer memory 114 may operate under control of the controller 112. For example, the high-speed buffer memory 114 may be configured to provide data stored therein to the memory device 111 and/or the nonvolatile memory device 113 and/or to store data from the memory device 111 and/or the nonvolatile memory device 113, under control of the controller 112.

Below, for convenience of description, it is assumed that the memory device 111 is a dynamic random access memory (DRAM) device (and may be referred to as DRAM device 111) and the high-speed buffer memory 114 is a static RAM (SRAM) device (and may be referred to as SRAM device 114).

However, the inventive concepts are not limited thereto. For example, the memory device 111 and the high-speed buffer memory 114 may be implemented with any type of memory device having a faster operating speed than the nonvolatile memory device 113. The high-speed buffer memory 114 may be implemented with any type of memory device having a faster operating speed than the memory device 111 and the nonvolatile memory device 113. That is, the memory device 111 may have a faster operating speed than the nonvolatile memory device 113, and the high-speed buffer memory 114 may have a faster operating speed than the memory device 111. In an example embodiment, the nonvolatile memory device 113 may have a greater storage space than the memory device 111.

Below, it is assumed that the storage module 110 communicates with the host 101 based on a double data rate (DDR) interface. However, the inventive concepts are not limited thereto. For example, an interface between the storage module 110 and the host 101 may include at least one of various interfaces such as a universal serial bus (USB) interface, a multimedia card (MMC) interface, a peripheral component interconnection (PCI) interface, a PCI-express (PCI-e) interface, an advanced technology attachment (ATA) interface, a serial-ATA (SATA) interface, a parallel-ATA (PATA) interface, a small computer small interface (SCSI) interface, an enhanced small disk interface (ESDI), an integrated drive electronics (IDE) interface, a mobile industry processor interface (MIPI), a nonvolatile memory-express (NVM-e) interface, a nonvolatile memory-express (NVM-e) interface, and a universal flash storage (UFS) interface. The provided list of interface types is merely an example, and other types of interfaces may be used between the host 101 and the storage module 110 without deviating from the inventive concepts.

In a page fault mode, the storage module 110 according to an embodiment of the inventive concepts may perform a data movement operation in response to a refresh command from the host 101. For example, as described above, the host 101 may access the DRAM device 111 based on the DDR interface. In the case where data (hereinafter referred to as "target data") which the host 101 intends to access is absent from the DRAM device 111, the host 101 may enter the page fault mode. The host 101 entering into the page fault mode may transmit the refresh command to the storage module 110.

The controller 112 of the storage module 110 may check signals exchanged between the host 101 and the DRAM device 111 and may determine whether the host 101 has entered the page fault mode. For example, a data manager 112a included in the controller 112 may check signals exchanged between the host 101 and the DRAM device 111 and may determine whether the target data is present in the DRAM device 111.

In the case where the target data is absent from the DRAM device 111, the host 101 may determine that the host 101 has entered the page fault mode. In this case, the data manager 112a may move/copy the target data stored in the nonvolatile memory device 113 to the SRAM device 114. In an example embodiment, since the movement/copy of data to the SRAM device 114 is performed between the nonvolatile memory device 113 and the SRAM device 114 under control of the controller 112, the host 101 and the DRAM device 111 may normally perform any other operations while the movement/copy is performed.

Afterwards, the storage module 110 may receive the refresh command from the host 101. In response to the refresh command, the storage module 110 may perform a refresh operation on the DRAM device 111 and may perform an operation of moving/copying the target data from the SRAM device 114 to the DRAM device 111. For example, the controller 112 may include a refresh command detector 112b configured to detect the refresh command from the host 101. In response to a detection result of the refresh command detector 112b, the controller 112 may perform the operation of moving/copying the target data from the SRAM device 114 to the DRAM device 111. In an example embodiment, the refresh operation and the data moving/copying operation may be performed during a refresh reference time (e.g., tRFC).

As described above, the storage module 110 according to an embodiment of the inventive concepts may determine whether the host 101 has entered the page fault mode based on an interface between the host 101 and the storage module 110; in the case where the host 101 enters the page fault mode, the storage module 110 may move/copy data from the nonvolatile memory device 113 to the SRAM device 114. Afterwards, in response to the refresh command from the host 101, the storage module 110 may perform the refresh operation associated with the DRAM device 111 and the operation of moving/copying the target data from the SRAM device 114 to the DRAM device 111, during the refresh reference time.

FIG. 2 is a flowchart illustrating an operation of a storage module of FIG. 1. Below, for convenience of description, in the page fault mode, an operation of moving/copying data from the nonvolatile memory device 113 to the SRAM device 114 is referred to as an "operation for preparing target data", and an operation of moving/copying data from the SRAM device 114 to the DRAM device 111 is referred to as an "operation of migrating target data". However, the above terms are only an example for describing an embodiment of the inventive concepts, and the inventive concepts are not limited thereto.

Referring to FIGS. 1 and 2, in operation S110, the storage module 110 may perform a normal operation. For example, the storage module 110 may perform various operations (e.g., a read operation, a write operation, and a refresh operation) under control of the host 101.

In operation S120, the storage module 110 may determine whether the host 101 has entered the page fault mode. For example, in the case where data (i.e., target data) which the host 101 requests is absent from the DRAM device 111, the host 101 may enter the page fault mode. The storage module 110 may determine whether the host 101 has entered the page fault mode, based on an interface between the host 101 and the storage module 110.

In an example embodiment, the host 101 may determine whether the target data is present in the DRAM device 111, based on a page table (not illustrated) stored in the DRAM device 111. The controller 112 of the storage module 110 may recognize the target data based on the above-described interface, and may determine whether the target data is present in the DRAM device 111, based on the page table (not illustrated) stored in the DRAM device 111. In the case where the target data is absent from the DRAM device 111, the host 101 may enter the page fault mode, and the storage module 110 may determine that the host 101 has entered the page fault mode.

In the case where the host 101 has not entered the page fault mode, the storage module 110 may perform the normal operation under control of the host 101.

In the case where the host 101 enters the page fault mode, in operation S130, the storage module 110 may perform the target data preparing operation. For example, in the case where the target data is absent from the DRAM device 111, the controller 112 of the storage module 110 may search the nonvolatile memory device 113 for the target data. The controller 112 may move/copy the found target data from the nonvolatile memory device 113 to the SRAM device 114.

In operation S140, the storage module 110 may receive a refresh command REF from the host 101. For example, the host 101 entering the page fault mode may transmit the refresh command REF to the storage module 110.

In operation S150, in response to the refresh command REF, the storage module 110 may perform the refresh operation associated with the DRAM device 111 and the target data migrating operation during the refresh reference time tRFC. For example, until the refresh reference time tRFC elapses from a time point when the refresh command REF is received from the host 101, any other command or signal may not be provided from the host 101. During this time (i.e., the refresh reference time tRFC), the storage module 110 may perform the refresh operation on the DRAM device 111 and may perform the target data migrating operation in which target data are moved/copied from the SRAM device 114 to the DRAM device 111.

In an example embodiment, with regard to the DRAM device 111, a minimum time (i.e., a minimum refresh reference time tRFC(min)) required to perform the refresh operation may be determined in advance. The minimum refresh reference time tRFC(min) may be determined according to a capacity, a structure, and a performance condition of the DRAM device 111. In an example embodiment, the refresh reference time tRFC when the refresh operation and the target data migrating operation are performed may be longer than the minimum refresh reference time tRFC(min).

In an example embodiment, after performing the target data migrating operation, the storage module 110 may update the page table (not illustrated) stored in the DRAM device 111. For example, the storage module 110 may update the page table based on information indicating that the target data is stored in the DRAM device 111. Afterwards, the host 101 may access the target data stored in the DRAM device 111 based on the updated page table.

In a conventional computing system, in the case where target data is absent from a DRAM device, a host enters the page fault mode, and then performs an operation of fetching the target data from any other storage device. In this case, separate commands for fetching data from any other storage device may be required, and a lot of delay time occurs upon performing the above-described operation.

In contrast, the storage module 110 according to an embodiment of the inventive concepts determines whether the host 101 has entered the page fault mode, performs the target data preparing operation depending on a result of the determination, and performs the target data migrating operation in response to the refresh command REF from the host 101. In this case, since the target data migrating operation is performed in response to the refresh command REF being a command present in the DDR interface, the target data migrating operation does not require a separate command. Also, since the target data migrating operation relates to an operation of moving data from the SRAM device 114 being a high-speed buffer memory to the DRAM device 111, an operating speed may be improved compared to an operation of moving data from the nonvolatile memory device 113 directly to the DRAM device 111. Also, since the target data preparing operation is performed between the nonvolatile memory device 113 and the SRAM device 114 under control of the controller 112, an operation between the host 101 and the DRAM device 111 may be normally performed regardless of the target data preparing operation. In other words, the target data preparing operation may be performed independently of an operation (e.g., a read operation, a write operation, and/or a refresh operation) between the host 101 and the DRAM device 111. That is, a delay time which is recognized by the outside due to the target data preparing operation is reduced or does not occur. Accordingly, an additional time delay necessary for data movement may decrease. As a result, according to an embodiment of the inventive concepts, a storage module with improved performance is provided.

Figure 3A:
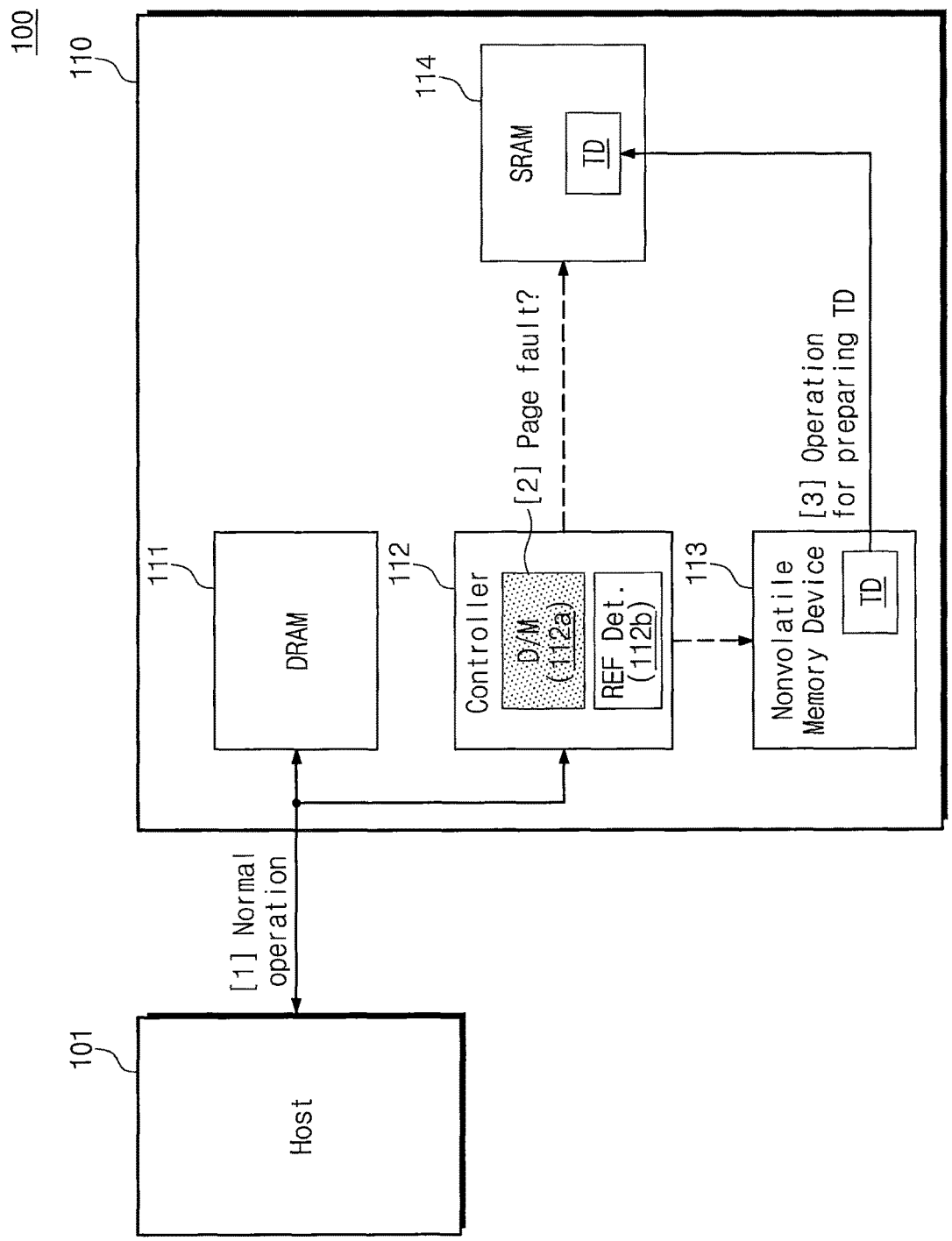
FIGS. 3A and 3B are diagrams describing an operation according to a flowchart of FIG. 2.
Figure 3B:
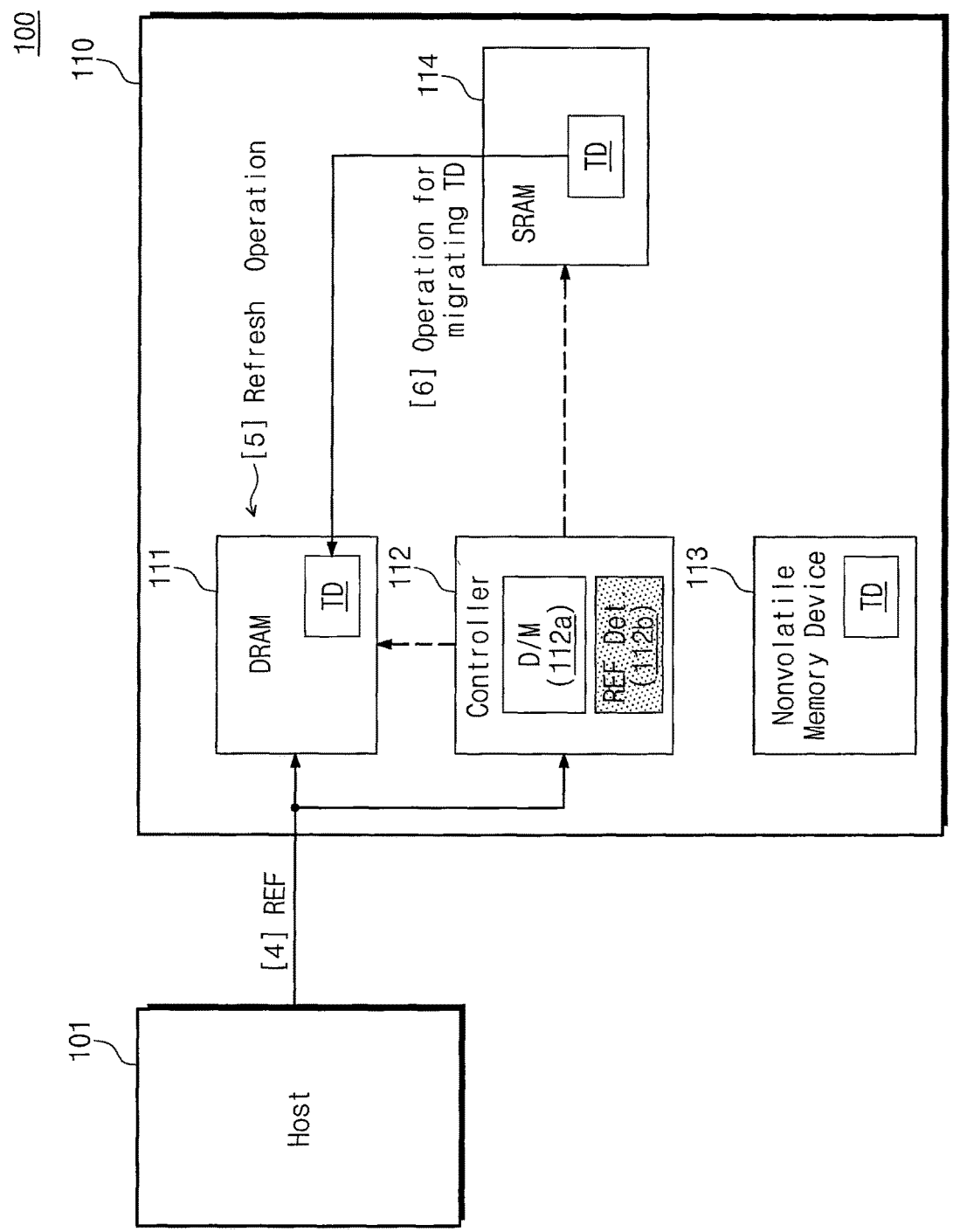

FIGS. 3A and 3B are diagrams describing an operation according to the flowchart of FIG. 2. For convenience of description, components and descriptions which are unnecessary to describe an embodiment of the inventive concepts will be omitted.

Referring to FIGS. 1, 3A, and 3B, the host 101 and the storage module 110 may perform a normal operation [1]. For example, the DRAM device 111 of the storage module 110 may perform the normal operation, such as a read operation, a write operation, or a refresh operation, under control of the host 101.

While the host 101 and the storage module 110 perform the normal operation, the host 101 may enter the page fault mode. In this case, the data manager 112a of the controller 112 may determine that the host 101 has entered the page fault mode [2]. For example, the controller 112 may share an interface between the host 101 and the DRAM device 111. That is, the controller 112 may determine whether the host 101 has entered the page fault mode by detecting signals and/or information exchanged between the host 101 and the DRAM device 111.

In the case where the host 101 enters the page fault mode, the controller 112 may perform the target data preparing operation [3]. For example, the controller 112 may move/copy target data TD stored in the nonvolatile memory device 113 to the SRAM device 114.

Afterwards, as illustrated in FIG. 3B, the host 101 may transmit the refresh command REF to the storage module 110 [4]. The DRAM device 111 of the storage module 110 may perform the refresh operation in response to the refresh command REF from the host 101 [5].

The controller 112 may perform the target data migrating operation in response to the refresh command REF from the host 101 [6]. For example, the controller 112 may include the refresh command detector 112b. In response to a detection result of the refresh command detector 112b, the controller 112 may move the target data TD stored in the SRAM device 114 to the DRAM device 111.

In an example embodiment, the operations [5] and [6] illustrated in FIG. 3B may be performed during the refresh reference time tRFC. In an example embodiment, during the refresh reference time tRFC, the host 101 may not provide any command and/or signal to the storage module 110.

In the example that is illustrated in FIG. 3B, the refresh operation is performed on the DRAM device 111 in response to the refresh command REF and the target data migrating operation is then performed, but the inventive concepts are not limited thereto. For example, the target data migrating operation may be first performed in response to the refresh command REF, and then, the refresh operation may be performed on the DRAM device 111. In some embodiments, the target data migrating operation and the refresh operation may be performed in parallel (e.g., at least a portion of the operations may be performed concurrently).

In an example embodiment, the target data preparing operation may be performed based on a first data unit, and the target data migrating operation may be performed based on a second data unit smaller than the first data unit. For example, the target data preparing operation may be performed based on a data input/output unit (e.g., utilizing a data input/output unit of a particular size, such as a page unit or a unit of 4 KB). For example, the nonvolatile memory device 113 may be configured to input and output data based on the page unit (e.g., 4 KB). The controller 112 may move/copy target data from the nonvolatile memory device 113 to the SRAM device 114 based on the page unit. In an example embodiment, the SRAM device 114 may be configured to have a greater storage space than the page unit of the nonvolatile memory device 113.

In an example embodiment, the target data migrating operation may be performed based on the page unit and/or based on a preset data unit. For example, the controller 112 may move/copy target data stored in the SRAM device 114 to the DRAM device 111 based on the page unit by performing the target data migrating operation.

In some embodiments, the controller 112 may move/copy target data stored in the SRAM device 114 to the DRAM device 111 based on the preset data unit by performing the target data migrating operation. The preset data unit may be smaller than the page unit. In this case, the controller 112 may move/copy target data from the SRAM device 114 to the DRAM device 111 by performing a plurality of target data migrating operations in response to a plurality of refresh commands REF from the host 101.

In an example embodiment, although not illustrated in drawings, the refresh operation of the DRAM device 111 and the target data preparing operation between the nonvolatile memory device 113 and the SRAM device 114 may be performed in parallel. Since the target data preparing operation is performed between the nonvolatile memory device 113 and the SRAM device 114, the DRAM device 111 may normally perform the refresh operation regardless of the target data preparing operation.

As described above, in the case where target data is absent from the DRAM device 111, since the refresh command REF and the refresh reference time tRFC already in use by the DRAM device 111 are used, data may be migrated from the nonvolatile memory device 113 to the DRAM device 111 without a reduction of performance and/or a time delay. This may mean that a storage module with improved performance is provided.

Figure 4:
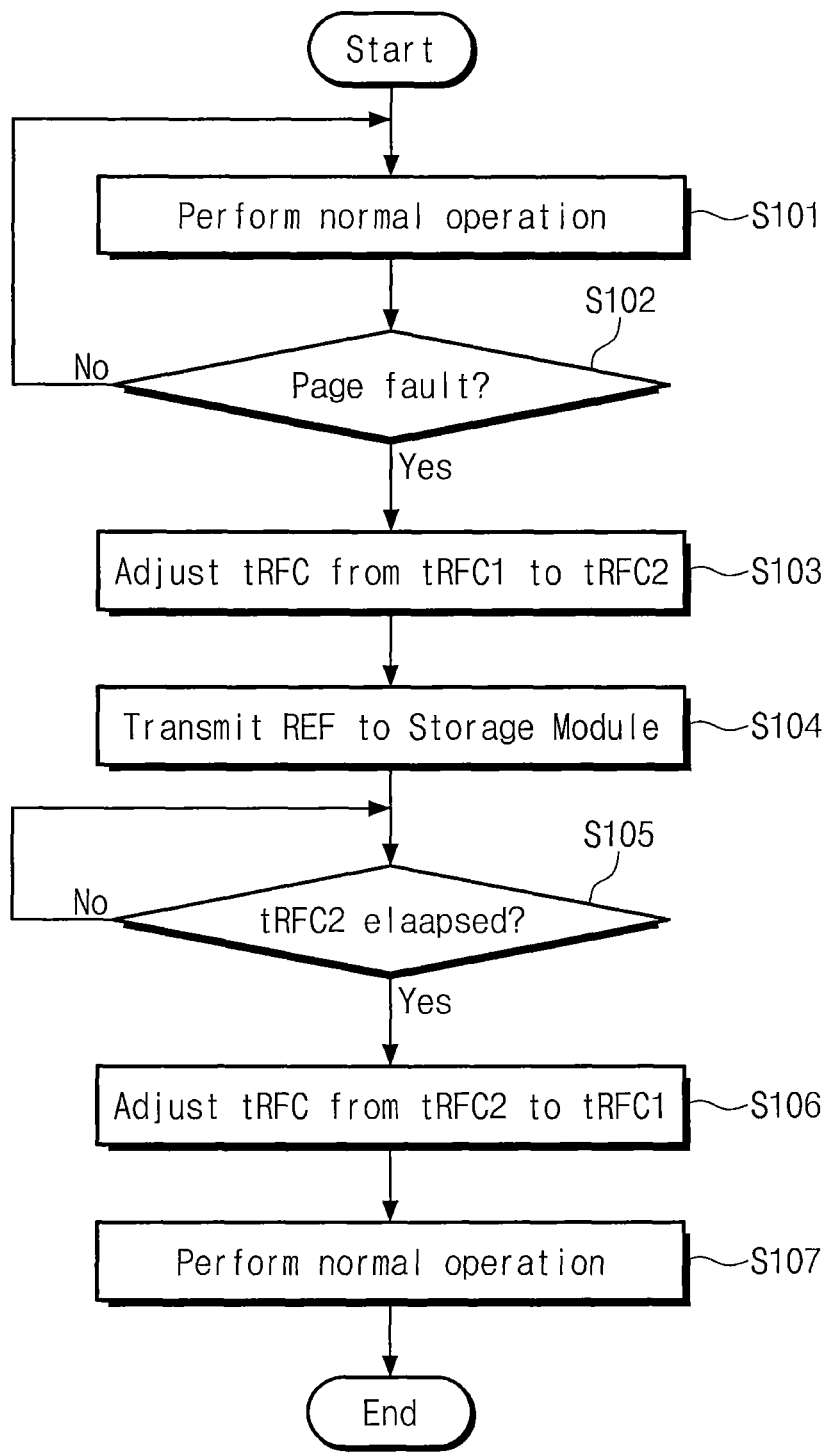
FIG. 4 is a flowchart illustrating an operation of a host of FIG. 1.

FIG. 4 is a flowchart illustrating an operation of a host of FIG. 1. For convenience of description, components or descriptions which are unnecessary to describe an embodiment of the inventive concepts will be omitted. Referring to FIGS. 1 and 4, in operation S101, the host 101 may perform a normal operation. For example, the host 101 and the storage module 110 may perform the normal operation (e.g., a read operation, a write operation, or a refresh operation) through the DDR interface. As used herein, references to a "normal" operation are not intended to be limiting, but are instead intending only to distinguish the operation from other types of operations, such as operations associated with the page fault mode.

In operation S102, the host 101 may determine whether a current mode is the page fault mode. For example, the host 101 may determine whether target data is stored in the DRAM device 111, based on the page table. The host 101 may perform the normal operation in the case where the target data is stored in the DRAM device 111 and may enter the page fault mode in the case where the target data is absent from the DRAM device 111. In an example embodiment, the storage module 110 may detect the page fault mode and may perform the target data preparing operation in response to a result of the detection.

In the case where the host 101 enters the page fault mode, in operation S103, the host 101 may adjust the refresh reference time tRFC from a first reference time tRFC1 to a second reference time tRFC2. For example, in the case where the host 101 performs the normal operation, the host 101 may not provide any other command and/or signal to the storage module 110 until the first reference time tRFC1 elapses from a time point when the refresh command REF is transmitted to the storage module 110. That is, the storage module 110 may perform a refresh operation during the first reference time tRFC1.

In contrast, in the case where the host 101 enters the page fault mode, the host 101 may adjust the refresh reference time tRFC to the second reference time tRFC2 longer than the first reference time tRFC1. To make the refresh reference time tRFC longer is to secure a time when the storage module 110 performs the refresh operation and the target data migrating operation. In an example embodiment, the refresh reference time tRFC may be changed by setting a register value of a kernel layer of the host 101.

Afterwards, in operation S104, the host 101 may transmit the refresh command REF to the storage module 110. In operation S105, the host 101 may determine whether the second reference time tRFC2 has elapsed. For example, as described above, the host 101 may not provide any other command and/or signal to the storage module 110 until the second reference time tRFC2 elapses from a time point when the refresh command REF is transmitted. This is to secure a time when the storage module 110 performs the refresh operation and the target data migrating operation. That is, in response to the refresh command REF, the storage module 110 may perform the refresh operation associated with the DRAM device 111 and the target data migrating operation. In other words, the refresh operation and the target data migrating operation may be performed during the second reference time tRFC2.

After the second reference time tRFC2 elapses, in operation S106, the host 101 may adjust the refresh reference time tRFC from the second reference time tRFC2 to the first reference time tRFC1. Afterwards, in operation S107, the host 101 may perform the normal operation. For example, the host 101 may provide a valid command to the storage module 110 and/or the DRAM device 111. In some embodiments, the host 101 may provide the refresh command REF to the storage module 110 and/or the DRAM device 111 based on the first reference time tRFC1. That is, in the normal operation, the host 101 may provide the refresh command REF to the storage module 110, and may provide any other valid command to the storage module 110 and/or the DRAM device 111 after the first reference time tRFC1 elapses.

As described above, the host 101 according to an embodiment of the inventive concepts may set a refresh reference time tRFC to the first reference time tRFC1 in the normal operation, and may set the refresh reference time tRFC to the second reference time tRFC2 longer than the first reference time tRFC1 upon entering the page fault mode. That is, the host 101 may change the refresh reference time tRFC depending on an operating mode. In this case, in the page fault mode, the storage module 110 may perform the refresh operation and the target data migrating operation during the second reference time tRFC2 in response to the refresh command REF.

Figure 5:
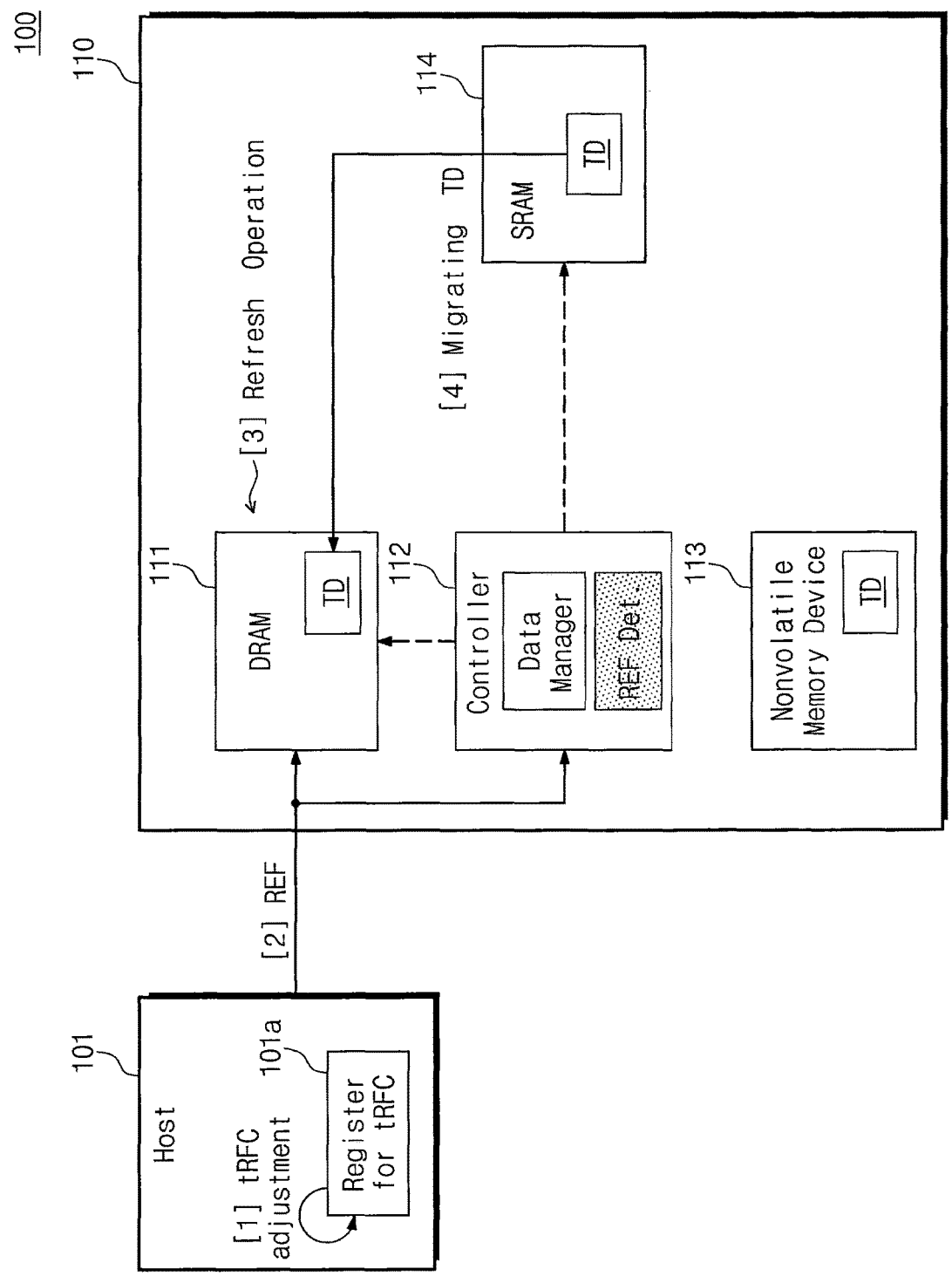
FIG. 5 is a diagram describing an operation according to a flowchart of FIG. 4.

FIG. 5 is a diagram describing an operation according to the flowchart of FIG. 4. For convenience of description, components and descriptions which are unnecessary to describe an embodiment of the inventive concepts will be omitted. Also, for convenience of description, it is assumed that the host 101 according to an embodiment of FIG. 5 is in a state of entering the page fault mode.

Referring to FIGS. 1 and 5, the host 101 entering the page fault mode may adjust the refresh reference time tRFC [1]. For example, the host 101 may include a register 101a associated with the refresh reference time tRFC. The register 101a may be included in and/or accessed via a kernel layer of the host 101. The host 101 may adjust the refresh reference time tRFC from the first reference time tRFC1 to the second reference time tRFC2 by adjusting a value of the register 101a. Afterwards, the host 101 may transmit the refresh command REF to the storage module 110 [2], the DRAM device 111 may perform the refresh operation [3], and the controller 112 may perform the target data migrating operation [4]. The operations [2], [3], and [4] are described above, and thus, additional description will be omitted to avoid redundancy.

In an example embodiment, in the case where the refresh command REF is transmitted and then the second reference time tRFC2 elapses, the host 101 may adjust the value of the register 101a from the second reference time tRFC2 to the first reference time tRFC1. Afterwards, the host 101 may perform a normal operation based on the first reference time tRFC1.

Figure 6A:
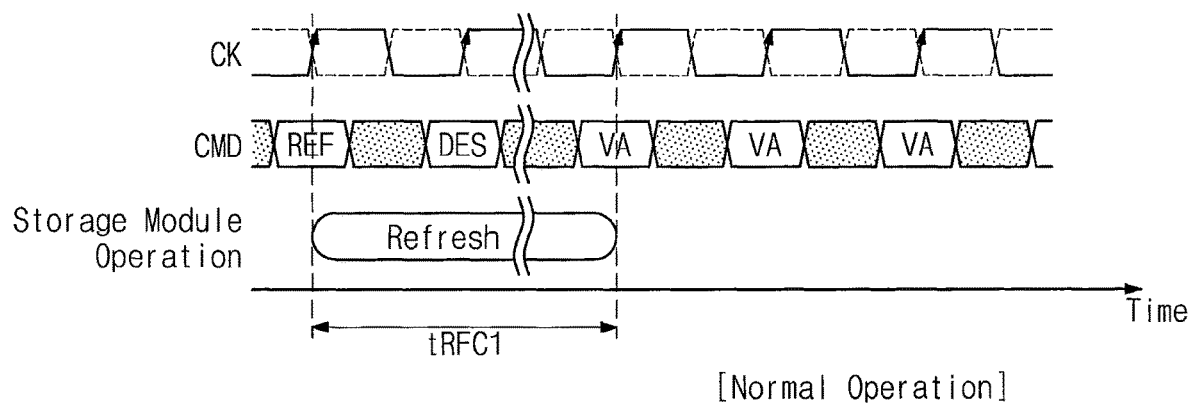
FIGS. 6A and 6B are timing diagrams describing refresh reference times according to a flowchart of FIG. 4.
Figure 6B:
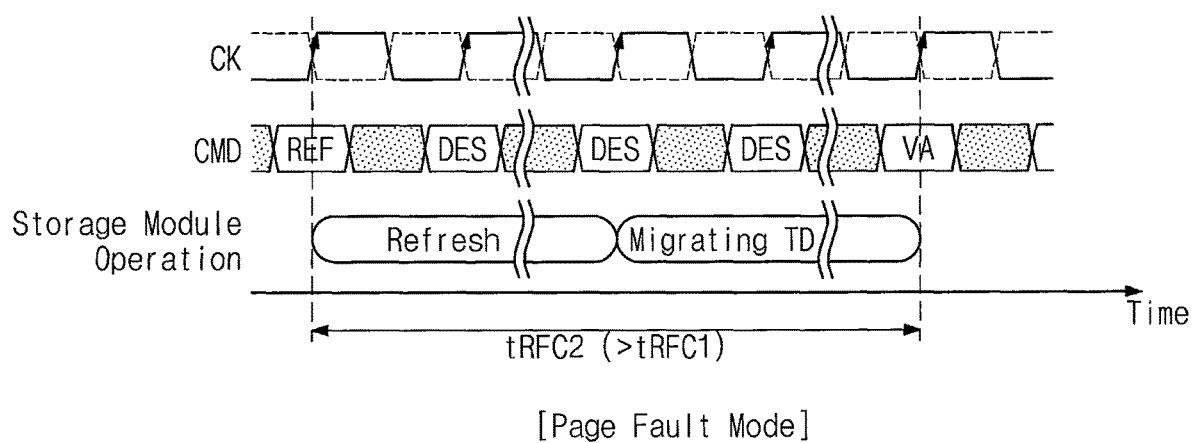

FIGS. 6A and 6B are timing diagrams describing refresh reference times according to the flowchart of FIG. 4. For convenience of description, components and descriptions which are unnecessary to describe an embodiment of the inventive concepts will be omitted.

First, referring to FIGS. 1 and 6A, in a normal operation, the host 101 may operate based on the first reference time tRFC1. For example, as illustrated in FIG. 6A, the host 101 may transmit the refresh command REF to the storage module 110. The storage module 110 (in particular, the DRAM device 111) may perform the refresh operation in response to the refresh command REF.

In the normal operation, the host 101 may transmit a valid command VA (e.g., an activate command ACT) after the first reference time tRFC1 elapses from a time point when the refresh command REF is transmitted. That is, the storage module 110 may perform the refresh operation during the first reference time tRFC1.

In contrast, as illustrated in FIG. 6B, in the page fault mode, the host 101 may change the refresh reference time tRFC to the second reference time tRFC2 longer than the first reference time tRFC1. In this case, the host 101 may transmit the valid command VA after the second reference time tRFC2 elapses from a time point when the refresh command REF is transmitted. As illustrated in FIG. 6B, in response to the refresh command REF, the storage module 110 may perform the refresh operation and the target data migrating operation during the second reference time tRFC2.

Figure 7:
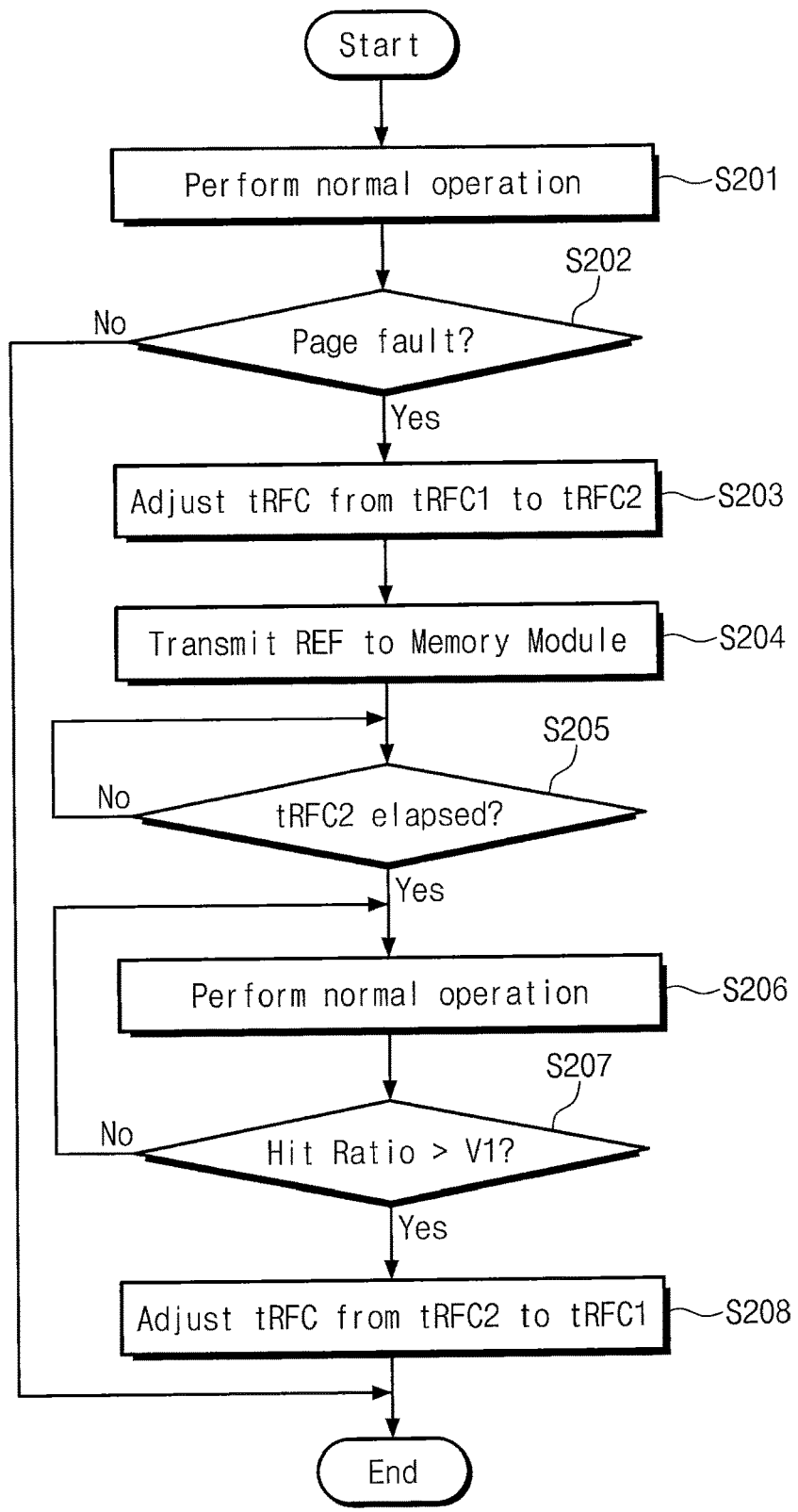
FIG. 7 is a flowchart illustrating an operation of a host of FIG. 1.

FIG. 7 is a flowchart illustrating an operation of a host of FIG. 1. For convenience of description, the above-described components and additional description associated with the above-described components will be omitted to avoid redundancy. Referring to FIGS. 1 and 7, host 101 may perform operation S201 to operation S205. Operation S201 to operation S205 may be similar to operation S101 to operation S105 of FIG. 4, and thus, additional description will be omitted to avoid redundancy.

In the case where the second reference time tRFC2 elapses after the refresh command REF is transmitted, in operation S206, the host 101 may perform a normal operation. That is, the host 101 may perform the normal operation, such as a read operation or a write operation, on the storage module 110.

In an example embodiment, in the case where the host 101 enters the page fault mode while the normal operation is performed in operation S206, the host 101 may transmit the refresh command REF to the storage module 110, and the storage module 110 may perform the refresh operation and the target data migrating operation in response to the refresh command REF. That is, while the normal operation is performed in operation S206, the refresh reference time tRFC may correspond to the second reference time tRFC2.

In operation S207, the host 101 may determine whether a hit ratio associated with an access to the storage module 110 is greater than a first value V1. For example, while the normal operation is performed, the host 101 may count the event in which the intended data is present in the DRAM device 111 (i.e., a hit event) and the event in which the intended data is absent from the DRAM device 111 (i.e., a miss event) and may manage the hit ratio associated with the storage module 110. In some embodiments, the hit ratio may be any value which allows for the comparison of the number of hit events to the number of miss events.

In an example embodiment, that the hit ratio is not greater than the first value V1 may mean that the frequency that the host 101 enters the page fault mode is high; that the hit ratio is greater than the first value V1 may mean that the frequency that the host 101 enters the page fault mode is low.

That is, in the case where the hit ratio is not greater than the first value V1, the host 101 performs the normal operation without changing the refresh reference time tRFC (i.e., with the refresh reference time tRFC maintained at the second reference time tRFC2). In the case where the hit ratio is greater than the first value V1, in operation S208, the host 101 may adjust the refresh reference time tRFC from the second reference time tRFC2 to the first reference time tRFC1.

As described above, the host 101 according to the inventive concepts may change the refresh reference time tRFC (i.e., may increase tRFC) upon entering the page fault mode. In the case where the hit ratio is greater than the first value V1 in the following normal operation, the host 101 may recover the refresh reference time tRFC (i.e., may decrease tRFC). Accordingly, in the case where the event that the host 101 enters the page fault mode does not occur frequently, the refresh reference time tRFC may be reduced, thus preventing or lessening the reduction of overall performance of the storage module 110.

In an example embodiment, a parameter such as a hit ratio associated with target data may be variously changed or modified. For example, the hit ratio associated with target data may be changed to the following conditions: the number of times that a normal operation is performed without a page fault, a time which elapses after entering the page fault mode, and the number of times that the host 101 enters the page fault mode during a particular time duration. However, the inventive concepts are not limited thereto.

Figure 8:
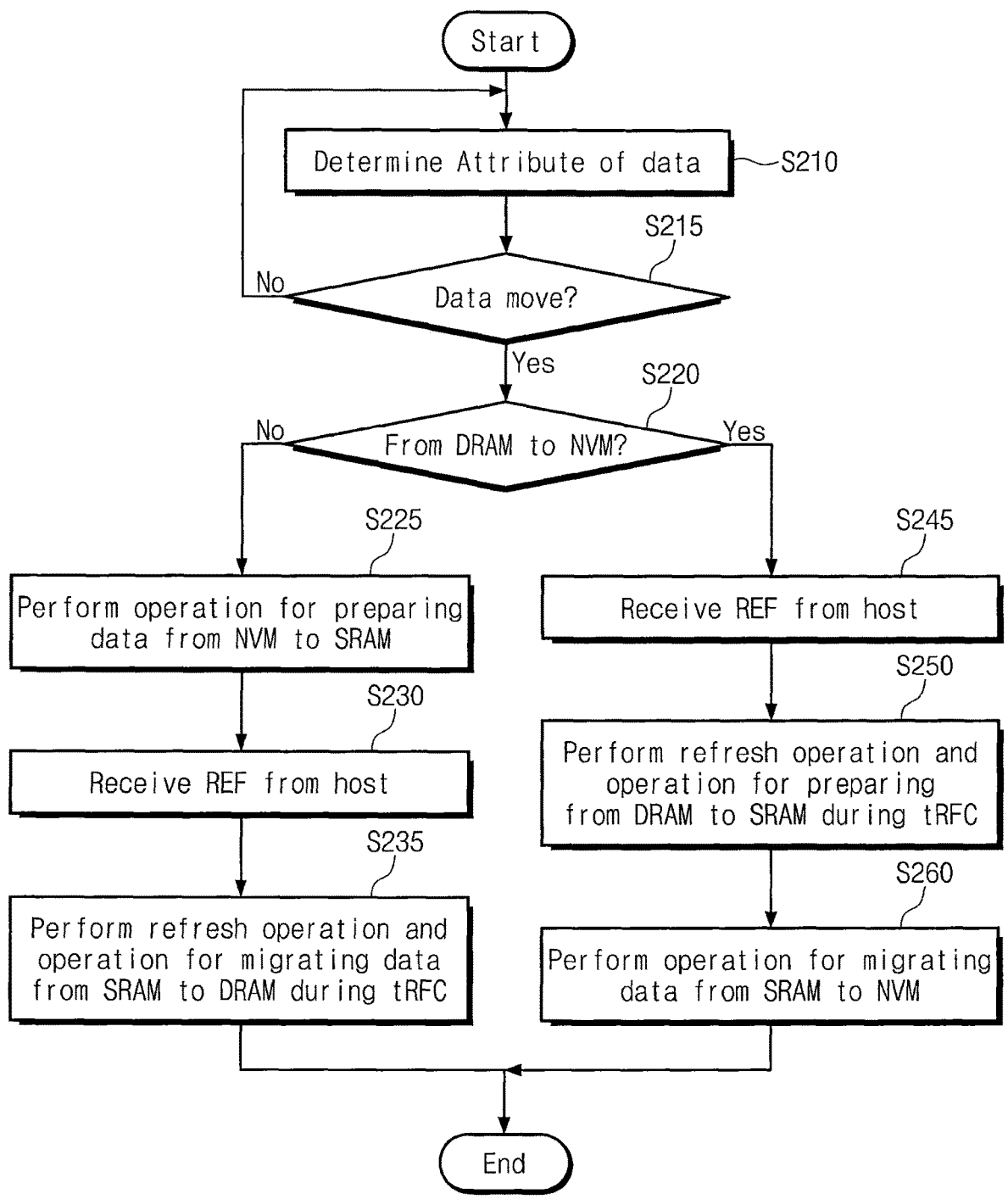
FIG. 8 is a flowchart illustrating an operation of a storage module of FIG. 1.

FIG. 8 is a flowchart illustrating an operation of a storage module of FIG. 1. For convenience of description, components which are unnecessary to describe an embodiment of the inventive concepts will be omitted. Referring to FIGS. 1 and 8, in operation S210, the storage module 110 may determine attributes of data. For example, the data manager 112a of the controller 112 may determine attributes of data stored in the DRAM device 111 and data stored in the nonvolatile memory device 113. The attributes of data may, for example, be determined based on the following conditions: the frequency that data are accessed from the host 101, the size of data, a kind of data (e.g., a file kind), and/or a retention time of data.

In operation S215, the storage module 110 may determine whether it is advantageous to move data. For example, it may be advantageous to move data that is not stored in the DRAM device 111 and is targeted for a frequent access of the host 101 from among data stored in the nonvolatile memory device 113 and/or data that has a high probability of being accessed from among the data stored in the nonvolatile memory device 113 to the DRAM device 111. That is, the frequency that a page fault occurs may decrease by moving data targeted for frequent access of the host 101 or data that has a high probability of being accessed from the host 101. This may mean that the overall performance of the storage module 110 is improved.

In some embodiments, an available capacity of the DRAM device 111 may be secured by moving data that is not accessed from the host 101 from among data stored in the DRAM device 111 to the nonvolatile memory device 113. That is, the overall performance of the storage module 110 may be improved by storing data to any one of the DRAM device 111 and the nonvolatile memory device 113 depending on data attributes.

In the case where it is advantageous to move data, in operation S220, the storage module 110 may determine whether a data movement corresponds to a movement from the DRAM device 111 to the nonvolatile memory device 113. For example, it may be advantageous to move data (e.g., cold data) having a low access frequency among data stored in the DRAM device 111 to the nonvolatile memory device 113.

Otherwise, it may be advantageous to move data having a high access frequency (or data with a high probability of being accessed) (e.g., hot data) among data stored in the nonvolatile memory device 113 to the DRAM device 111.

In the case where it is advantageous to move data from the nonvolatile memory device 113 to the DRAM device 111 (i.e., No in operation S220), in operation S225, the storage module 110 may perform a data preparing operation in which data is moved from the nonvolatile memory device 113 to the SRAM device 114. For example, the controller 112 may move/copy data (e.g., hot data) targeted for movement among data stored in the nonvolatile memory device 113 to the SRAM device 114.

In an example embodiment, since the data preparing operation corresponding to operation S225 is performed between the nonvolatile memory device 113 and the SRAM device 114 under control of the controller 112, the DRAM device 111 may perform a normal operation under control of the host 101 regardless of the data preparing operation corresponding to operation S225.

Afterwards, in operation S230, the storage module 110 may receive the refresh command REF from the host 101.

In operation S235, in response to the refresh command REF, the storage module 110 may perform the refresh operation and a data migrating operation during the refresh reference time tRFC. For example, the DRAM device 111 may perform the refresh operation in response to the refresh command REF. The controller 112 may move/copy data (i.e., hot data) stored in the SRAM device 114 to the DRAM device 111 in response to the refresh command REF. In an example embodiment, the refresh operation and the data migrating operation may be performed during the refresh reference time (e.g., tRFC).

In the case where it is advantageous to move data from the DRAM device 111 to the nonvolatile memory device 111 (i.e., Yes in operation S220), in operation S245, the storage module 110 may receive the refresh command REF from the host 101.

In operation S250, in response to the refresh command REF, the storage module 110 may perform the refresh operation and the data migrating operation during the refresh reference time tRFC. For example, the DRAM device 111 may perform the refresh operation in response to the refresh command REF. In response to the refresh command REF, the controller 112 may move/copy data (i.e., cold data), which has a low access frequency or has a low probability of being accessed, from among data stored in the DRAM device 111 to the SRAM device 114. In an example embodiment, the refresh operation and the data preparing operation may be performed during the refresh reference time tRFC.

Afterwards, in operation S260, the storage module 110 may perform the data migrating operation in which data are migrated from the SRAM device 114 to the nonvolatile memory device 113. For example, the storage module 110 may move/copy data (e.g., cold data) stored in the SRAM device 114 to the nonvolatile memory device 113. In an example embodiment, since the data migrating operation corresponding to operation S260 is performed between the SRAM device 114 and the nonvolatile memory device 113 under control of the controller 112, the DRAM device 111 may perform a normal operation under control of the host 101 regardless of the data migrating operation corresponding to operation S260.

In an example embodiment, after operation S235 and/or operation S260, the storage module 110 may update the page table. For example, the storage module 110 may update the page table based on information about particular data which have been moved between the DRAM device 111 and the nonvolatile memory device 113. The host 101 may determine whether the particular data is present in the DRAM device 111, based on the updated page table.

Figure 9:
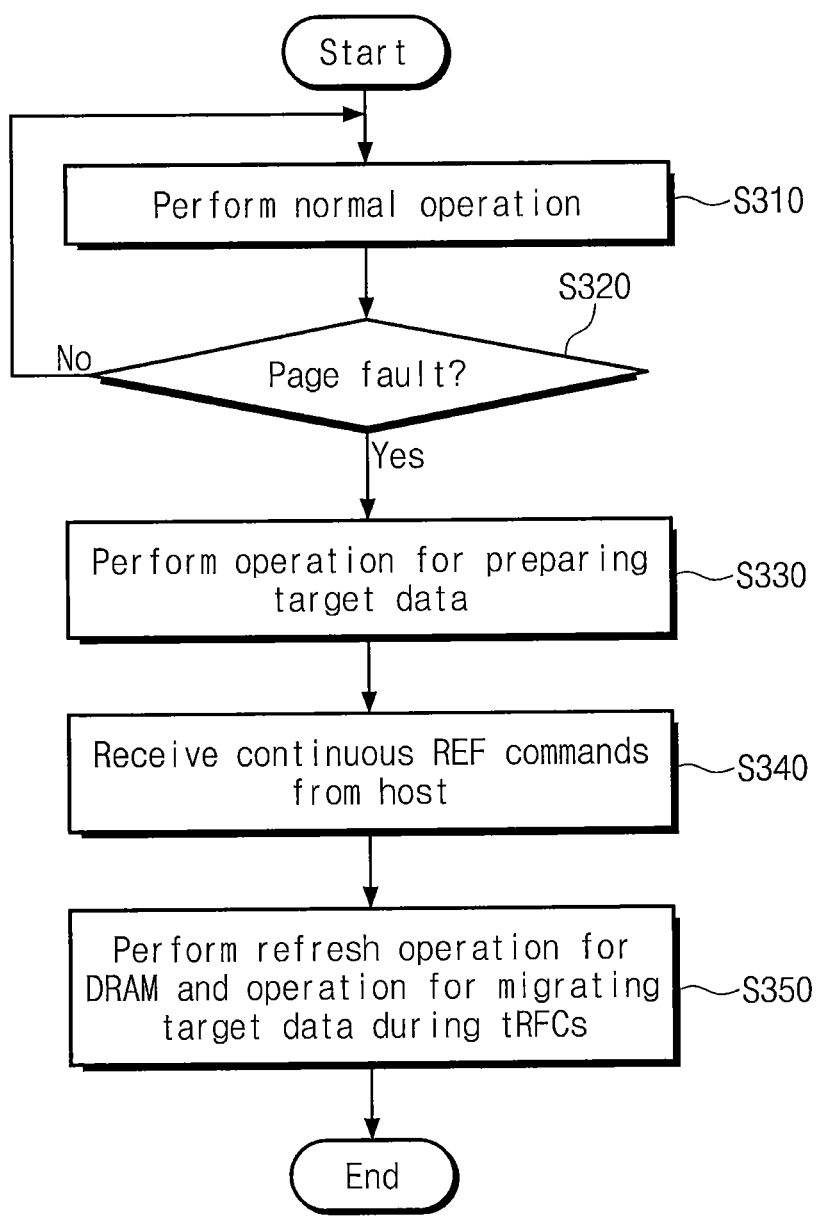
FIG. 9 is a flowchart illustrating an operation of a storage module of FIG. 1.
Figure 10:
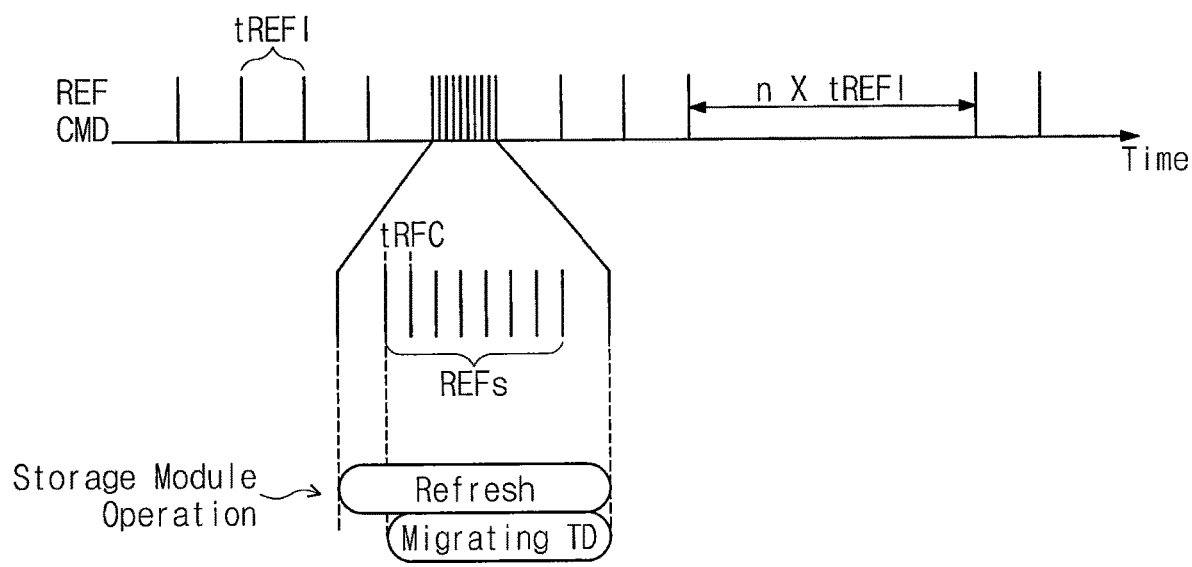
FIG. 10 is a diagram describing an operation according to a flowchart of FIG. 9.

FIG. 9 is a flowchart illustrating an operation of a storage module of FIG. 1. FIG. 10 is a diagram describing an operation according to the flowchart of FIG. 9. For convenience of description, components which are unnecessary to describe an embodiment of the inventive concepts and descriptions thereof will be omitted.

Referring to FIGS. 1, 9, and 10, operation S310 and operation S330 may be performed. Operation S310 to operation S330 are similar to operation S110 to operation S130 of FIG. 2, and thus, additional description will be omitted to avoid redundancy.

In operation S340, the storage module 110 may receive continuous refresh commands from the host 101. For example, as illustrated in FIG. 10, the host 101 may transmit the refresh command REF to the storage module 110 at an interval of a refresh period tREFI. During the interval (i.e., tREFI) between the refresh commands REF, the host 101 may exchange various commands and/or signals with the storage module 110 (in detail, the DRAM device 111) for the purpose of performing a normal operation.

In the case where the host 101 enters the page fault mode, the host 101 may transmit a plurality of refresh commands REF to the storage module 110 during the refresh period tREFI. In this case, the respective refresh commands REF may be provided at an interval of the refresh reference time tRFC.

In operation S350, in response to the continuous refresh commands REF, the storage module 110 may perform the refresh operation associated with the DRAM device 111 and the target data migrating operation during a plurality of refresh reference times tRFCs. For example, the DRAM device 111 may perform the refresh operation in response to each of the continuous refresh commands REF from the host 101. The controller 112 may perform the target data migrating operation in response to the continuous refresh commands REF. In detail, as illustrated in FIG. 10, the controller 112 may perform the target data migrating operation in response to another refresh command received immediately after the refresh reference time tRFC elapses from a time point when one refresh command is received.

As described above, in the case where the plurality of refresh commands REF are continuously received at an interval of the refresh reference time tRFC, any other separate command or signal may not be provided from the host 101. That is, while the plurality of refresh commands REF are continuously provided, the DRAM device 111 may not receive any other request from the host 101.

Accordingly, the controller 112 may perform the target data migrating operation during the remaining time except for a time when the DRAM device 111 performs the refresh operation. In this case, the target data migrating operation may be normally performed without increasing or changing the refresh reference time tRFC.

Figure 11:
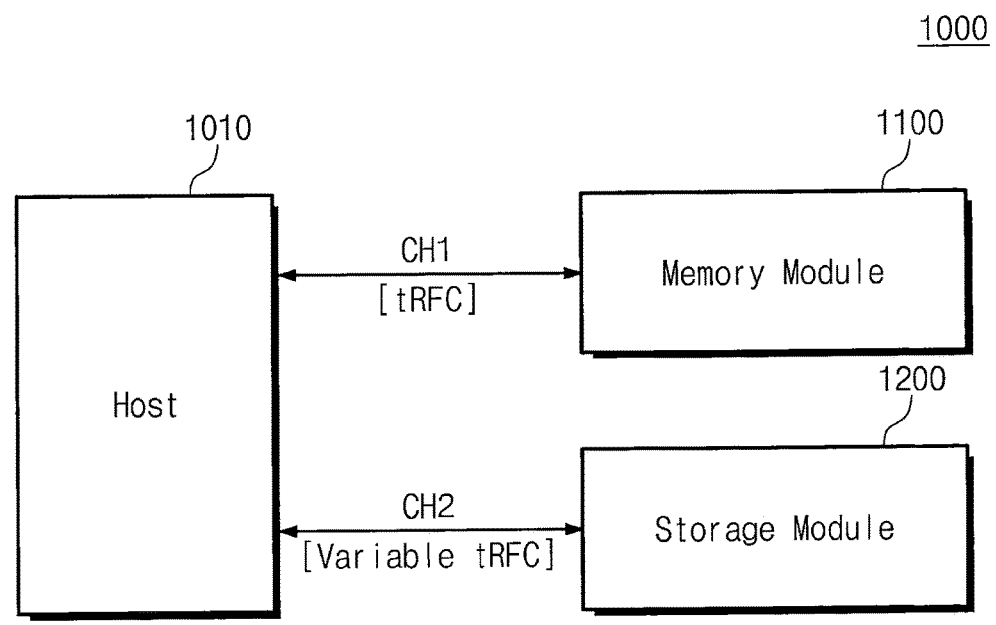
FIG. 11 is a block diagram illustrating a computing system according to an embodiment of the inventive concepts.

FIG. 11 is a block diagram illustrating a computing system according to an embodiment of the inventive concepts. Referring to FIG. 11, a computing system 1000 may include a host 1010, a memory module 1100, and a storage module 1200. The host 1010 may communicate with the memory module 1100 through a first channel CH1 and may communicate with the storage module 1200 through a second channel CH2. In an example embodiment, the first and second channels CH1 and CH2 may be a DDR interface-based channel, but the inventive concepts are not limited thereto.

The memory module 1100 may operate under control of the host 1010. In an example embodiment, the memory module 1100 may be a dual in-line memory module (DIMM) including DRAM devices.

The storage module 1200 may operate under control of the host 1010. In an example embodiment, the storage module 1200 of FIG. 11 may be a storage module (e.g., storage module 110) described with reference to FIGS. 1 to 10 or may operate based on a method described with reference to FIGS. 1 to 10. For example, the storage module 1200 may include a DRAM device, a controller, a nonvolatile memory device, and an SRAM device. The storage module 1200 may move target data from the nonvolatile memory device to the SRAM device depending on a mode (i.e., the page fault mode) of the host 1010, and may move data from the SRAM device to the DRAM device in response to the refresh command REF from the host 1010.

In an example embodiment, the host 1010 may control the memory module 1100 by using a fixed refresh reference time tRFC. That is, the host 1010 may control the memory module 1100 by using the fixed refresh reference time tRFC having a predetermined value.

In contrast, the host 1010 may control the storage module 1200 by using a variable refresh reference time tRFC. That is, the host 1010 may perform a normal operation on the storage module 1200 by using a first refresh reference time tRFC1, and may control the storage module 1200 by using a second refresh reference time tRFC2 longer than the first refresh reference time tRFC1 in the page fault mode.

In an example embodiment, the memory module 1100 and the storage module 1200 may have the same form-factor as the DIMM. The host 1010 may determine whether a connected module is a normal memory module or a storage module, based on information from a serial presence detect (SPD) chip included in each of the memory module 1100 and the storage module 1200 and may control each module depending on a result of the determination as described above.

Figure 12:
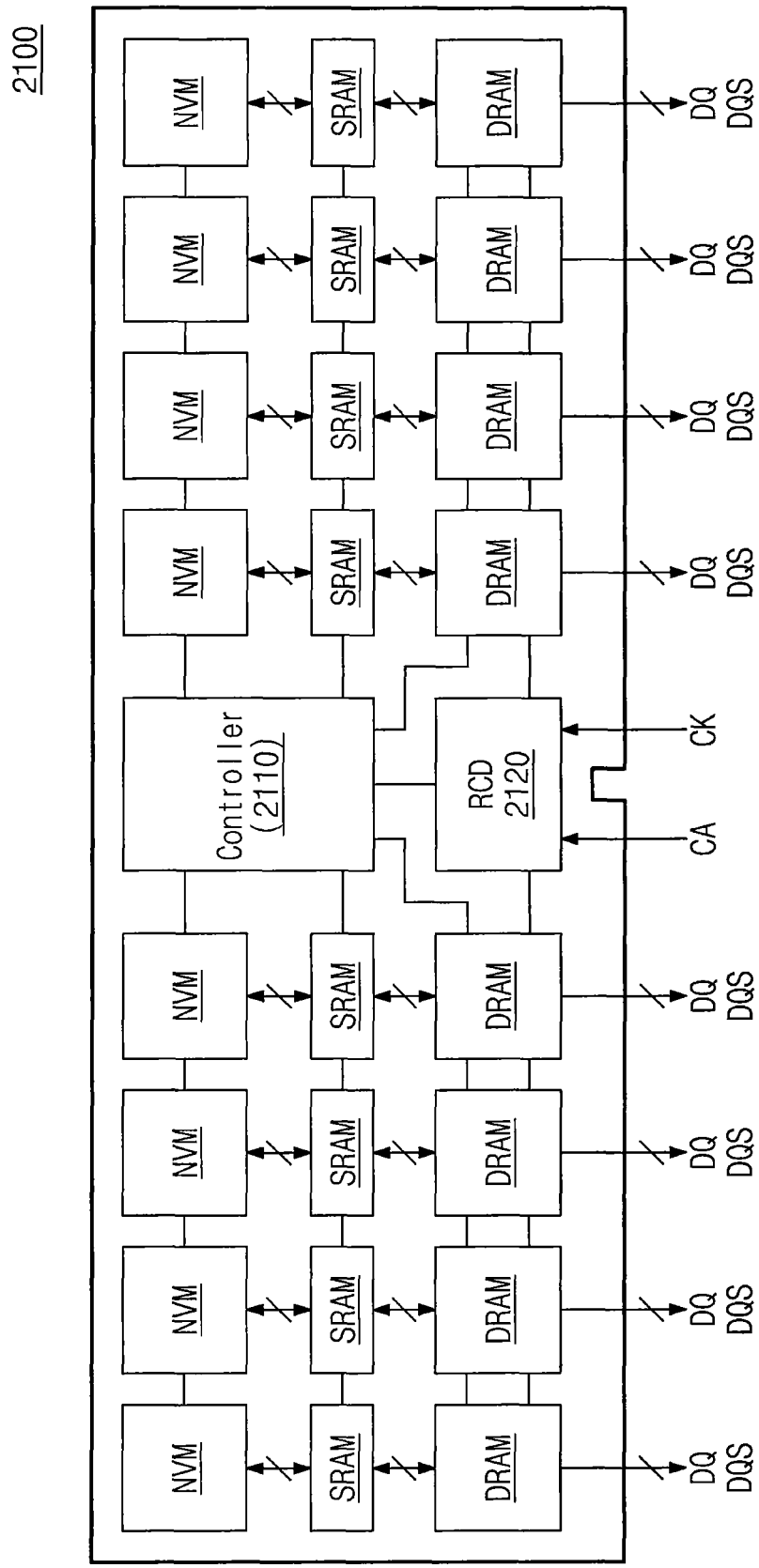
FIG. 12 is a diagram illustrating a storage module according to an embodiment of the inventive concepts.

FIG. 12 is a diagram illustrating a storage module according to an embodiment of the inventive concepts. Referring to FIG. 12, a storage module 2100 may include a plurality of nonvolatile memory devices NVM, a plurality of SRAM devices SRAM, a plurality of DRAM devices DRAM, a controller 2110, and a register clock driver (RCD) 2120.

The RCD 2120 may receive a command/address CA and a clock signal CK from an external device (e.g., a host) and may provide the received signals to the plurality of DRAM devices DRAM and the controller 2110.

Each of the plurality of DRAM devices DRAM may exchange data with the external device through data lines DQ and data strobe lines DQS in response to a signal from the RCD 2120.

The plurality of nonvolatile memory devices NVM may respectively exchange data with the plurality of SRAM devices SRAM under control of the controller 2110. The plurality of SRAM devices SRAM may respectively exchange data with the plurality of nonvolatile memory devices NVM or the plurality of DRAM devices DRAM under control of the controller 2110.

In an embodiment, the controller 2110 may be a controller (e.g., controller 112) described with reference to FIGS. 1 to 10. For example, the controller 2110 may detect the page fault mode of the external device, may perform the target data preparing operation, in which target data is moved/copied from the plurality of nonvolatile memory devices NVM to the plurality of SRAM devices SRAM, depending on a result of the detection, and may perform the target data migrating operation, in which data is moved/copied from the plurality of SRAM devices SRAM to the plurality of DRAM devices DRAM, in response to a refresh command from the external device.

The storage module 2100 is illustrated in FIG. 12 in the form of a registered DIMM (RDIMM), but the inventive concepts are not limited thereto. The storage module 2100 may be implemented in various forms such as, for example, a DIMM, an RDIMM, an LRDIMM, an UDIMM, and an NVDIMM.

Figure 13:
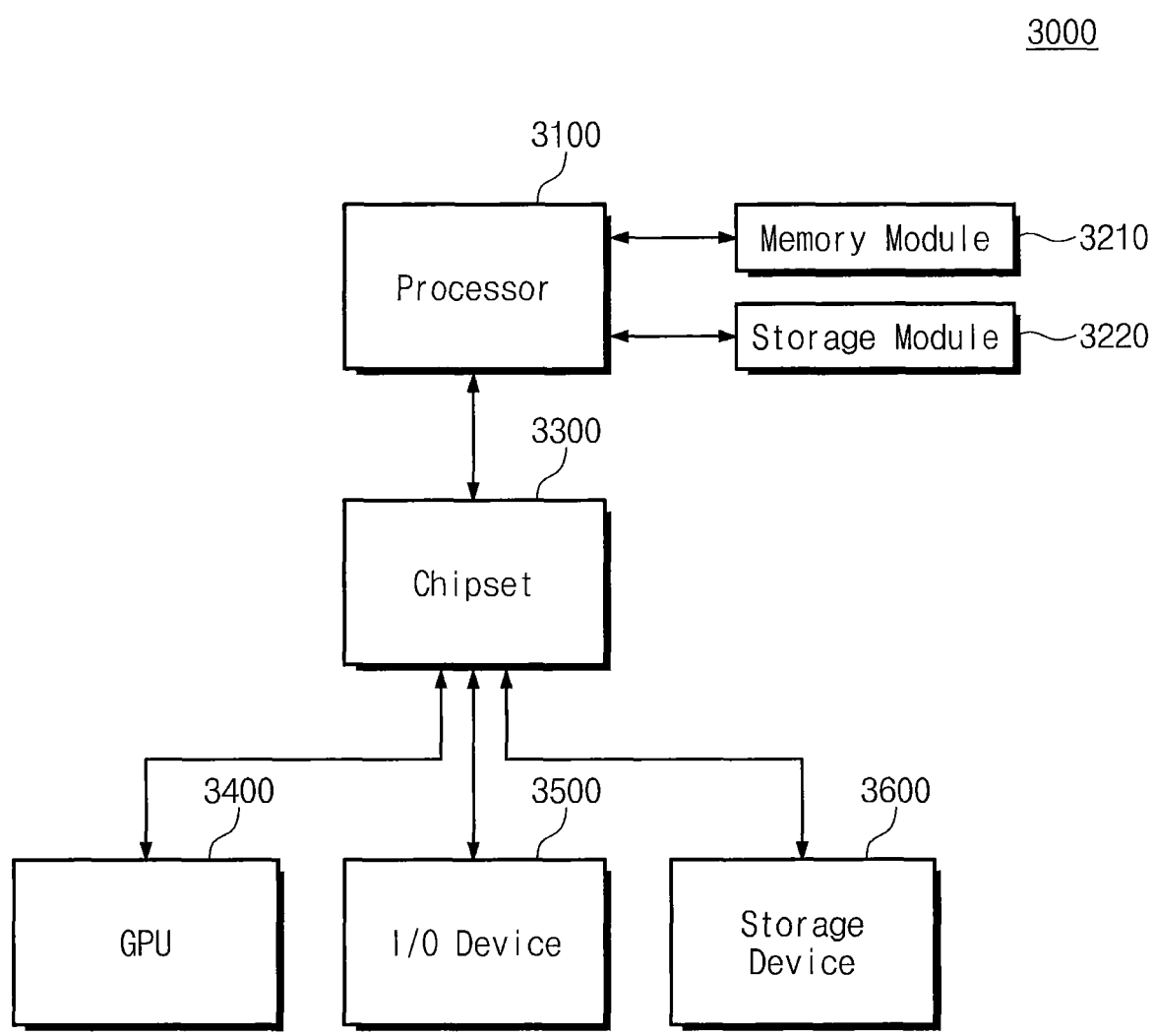
FIG. 13 is a block diagram illustrating a user system to which a storage module according to an embodiment of the inventive concepts may be applied.

FIG. 13 is a block diagram illustrating a user system to which a storage module according to an embodiment of the inventive concepts may be applied. A user system 3000 may include, for example, a computer, a portable computer, a ultra-mobile personal computer (UMPC), a workstation, a server computer, a net-book, a personal digital assistant (PDA), a portable computer, a web tablet, a wireless phone, a mobile phone, a smartphone, a digital camera, a digital audio recorder, a digital audio player, a digital picture recorder, a digital picture player, a digital video recorder, a digital video player, a device which may transmit or receive information in a wireless environment, and/or one of various electronic devices including a home network.

The user system 3000 may include a processor 3100, a memory module 3210, a storage module 3220, a chipset 3300, a graphic processing unit 3400, an input/output device 3500, and a storage device 3600. The processor 3100 may control overall operations of the user system 3000. The processor 3100 may perform various operations of the user system 3000.

The memory module 3210 and the storage module 3220 may be connected with the processor 3100. In some embodiments, the memory module 3210 and the storage module 3220 may be directly connected with the processor 3100. For example, the memory module 3210 and the storage module 3220 may have the form of a dual in-line memory module (DIMM), and the memory module 3210 and the storage module 3220 may be installed in a DIMM socket connected with the processor 3100 and may communicate with the processor 3100 based on the DDR interface.

In an example embodiment, the storage module 3220 may be a storage module (e.g., storage module 110) described with reference to FIGS. 1 to 11 or may operate in a similar manner to the storage module. In an example embodiment, the processor 3100 may vary the refresh reference time tRFC associated with the storage module 3220.

The chipset 3300 may be electrically connected to the processor 3100 and may control hardware of the user system 3000 under control of the processor 3100. For example, the chipset 3300 may be connected with the GPU 3400, the input/output device 3500, and the storage device 3600 through main buses, and may perform a bridge operation for the main buses.

The GPU 3400 may perform a series of operations for outputting image data of the user system 3000. In an example embodiment, the GPU 3400 may be embedded in the processor 3100 in the form of a system-on-chip.

The input/output device 3500 includes various devices which make it possible to input data and/or an instruction to the user system 3000 and/or to output data to an external device. The storage device 3600 may be used as a high-capacity storage medium of the user system 3000. The storage device 3600 may include, for example, high-capacity storage media such as a hard disk drive (HDD), a solid state drive (SSD), a memory card, and a memory stick.

Figure 14:
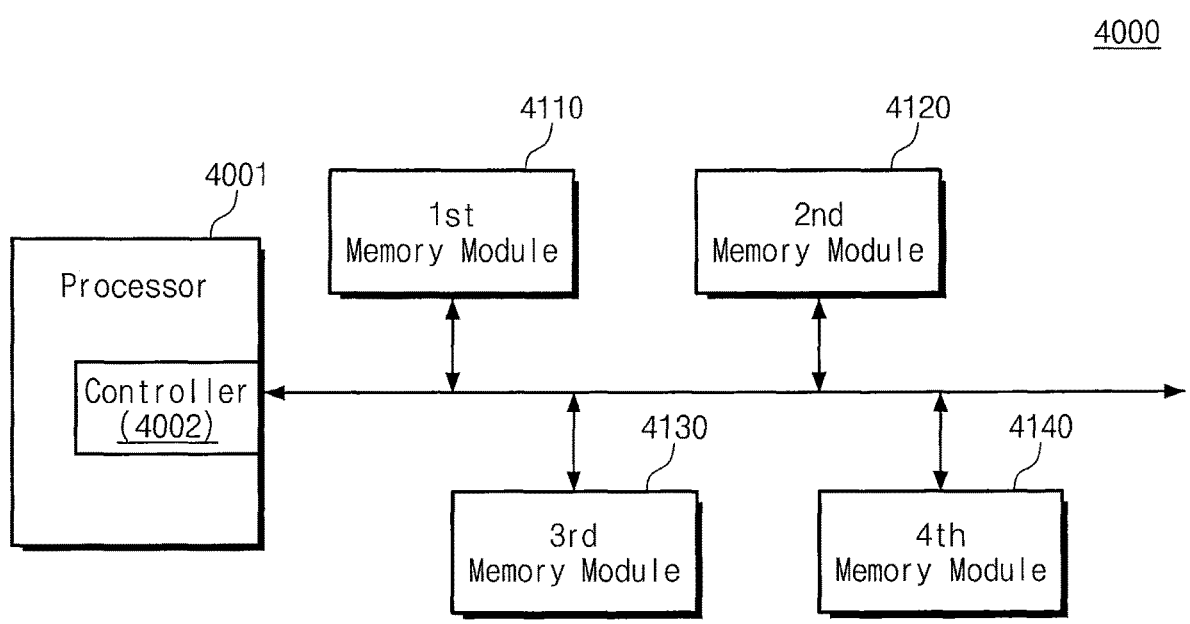
FIG. 14 is a block diagram illustrating a user system to which a storage module according to an embodiment of the inventive concepts may be applied.

FIG. 14 is a block diagram illustrating a user system to which a storage module according to an embodiment of the inventive concepts may be applied. Referring to FIG. 14, a user system 4000 may include a processor 4001, a first memory module 4110, a second memory module 4120, a third memory module 4130, and a fourth memory module 4140 (hereinafter referred to as first to fourth memory modules 4110 to 4140).

The processor 4001 may include a controller 4002 configured to control the first to fourth memory modules 4110 to 4140, respectively. In an example embodiment, at least one memory module of the first to fourth memory modules 4110 to 4140 may be a storage module (e.g., storage module 110) described with reference to FIGS. 1 to 12 or may operate in a similar manner to the storage module.

In an example embodiment, the controller 4002 included in the processor 4001 may support a method of operating a storage module and/or a method of operating a host, which is described with reference to FIGS. 1 to 12. For example, the controller 4002 of the processor 4001 may be configured to vary the refresh reference time tRFC associated with a storage module of the first to fourth memory modules 4110 to 4140. In some embodiments, the controller 4002 may be configured to perform one or more functions of a controller included in a storage module of the first to fourth memory modules 4110 to 4140.

In an example embodiment, the controller 4002 may be implemented in the form of hardware, software, or a combination thereof. Operations or functions associated with the controller 4002 may be provided in the form of a device driver.

According to the inventive concepts, in the case where a host enters a page fault mode, a storage module may perform a target data preparing operation in which target data is moved from a nonvolatile memory device to a high-speed buffer memory, and then may move the target data of the high-speed buffer memory to a DRAM device in response to a refresh command from the host during a refresh reference time. In this case, since the target data preparing operation is independently performed and the target data migrating operation is performed during the refresh reference time, data may be moved from the nonvolatile memory device to the DRAM device without a reduction of performance. Accordingly, a storage module with improved performance, a method of operating the storage device, and method of operating a host controlling the storage module are provided.

It will be understood that although the terms "first," "second," etc. are used herein to describe members, regions, layers, portions, sections, components, and/or elements in example embodiments of the inventive concepts, the members, regions, layers, portions, sections, components, and/or elements should not be limited by these terms. These terms are only used to distinguish one member, region, portion, section, component, or element from another member, region, portion, section, component, or element. Thus, a first member, region, portion, section, component, or element described below may also be referred to as a second member, region, portion, section, component, or element without departing from the scope of the inventive concepts. For example, a first element may also be referred to as a second element, and similarly, a second element may also be referred to as a first element, without departing from the scope of the inventive concepts.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by those of ordinary skill in the art to which the inventive concepts pertain. It will also be understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When a certain example embodiment may be implemented differently, a specific process order may be performed differently from the described order. For example, two consecutively described processes may be performed substantially at the same time or performed in an order opposite to the described order.

As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on").

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

While the inventive concepts have been described with reference to example embodiments thereof, it will be apparent to those of ordinary skill in the art that various changes and modifications may be made thereto without departing from the spirit and scope of the inventive concepts as set forth in the following claims.

What is claimed is:

1. A method of operating a storage module comprising a dynamic random access memory (DRAM) device, a nonvolatile memory device, and a high-speed buffer memory, the method comprising:
    copying target data stored in the nonvolatile memory device to the high-speed buffer memory responsive to an external device entering a page fault mode;
    receiving a first refresh command from the external device;
    in response to the first refresh command, performing a first refresh operation associated with the DRAM device and moving the target data copied to the high-speed buffer memory to the DRAM device during a first refresh reference time,
    performing a second refresh operation on the DRAM device in response to receiving a second refresh command, when the external device is not in the page fault mode; and
    receiving a first valid command from the external device after a second refresh reference time shorter than the first refresh reference time elapses from a time point when the second refresh command is received.

2. The method of claim 1, wherein a signal is not provided from the external device until the first refresh reference time elapses from a time point when the first refresh command is received.

3. The method of claim 1, further comprising:
    receiving a second valid command from the external device after the first refresh reference time elapses from a time point when the first refresh command is received.

4. The method of claim 1, wherein the target data is copied to the high-speed buffer memory based on an input/output data unit of the nonvolatile memory device.

5. The method of claim 1, wherein whether the external device enters the page fault mode is determined based on a page table comprising information about data previously stored in the DRAM device.

6. The method of claim 5, further comprising:
    updating the page table based on information indicating that the target data is moved to the DRAM device.

7. The method of claim 1, wherein copying the target data stored in the nonvolatile memory device to the high-speed buffer memory is performed independently of an operation between the external device and the DRAM device.

8. The method of claim 1, wherein a first operating speed of the high-speed buffer memory is faster than a second operating speed of the nonvolatile memory device.

9. The method of claim 1, wherein a first storage capacity of the nonvolatile memory device is greater than a first storage capacity of the high-speed buffer memory and is greater than a third storage capacity of the DRAM device.

10. The method of claim 1, wherein the DRAM device and the external device communicate with each other based on a double data rate (DDR) interface.

11. A storage module comprising:
a dynamic random access memory (DRAM) device configured to communicate with an external device through a first interface and perform a refresh operation in response to a refresh command from the external device;
a nonvolatile memory device;
a high-speed buffer memory; and
a controller coupled to the first interface and configured to:
copy target data from the nonvolatile memory device to the high-speed buffer memory responsive to the external device entering a page fault mode,
wherein, when the external device is in the page fault mode, the controller is further configured to move the target data copied to the high-speed buffer memory to the DRAM device in response to the refresh command,
wherein, when the external device is in the page fault mode, the DRAM device is further configured to receive a valid command from the external device after a first refresh reference time elapses from a time point when the refresh command is received from the external device, and, when the external device is not in the page fault mode, the DRAM device is further configured to receive the valid command from the external device after a second refresh reference time elapses from the time point when the refresh command is received from the external device, and
wherein the first refresh reference time is longer than the second refresh reference time.

12. The storage module of claim 11, wherein, from the time point when the refresh command is received from the external device until the first refresh reference time or the second refresh reference time elapses, a signal is not provided through the first interface.

13. The storage module of claim 11, wherein the DRAM device is further configured to perform an operation corresponding to the received valid command.

14. The storage module of claim 11, wherein the controller is further configured to copy the target data from the nonvolatile memory device to the high-speed buffer memory based on a first data unit, and to move the target data copied to the high-speed buffer memory to the DRAM device based on a second data unit identical to or smaller than the first data unit.

15. The storage module of claim 11, wherein the controller is further configured to:
determine whether the external device has entered the page fault mode based on a page table comprising information about data previously stored in the DRAM device; and
after moving the target data copied to the high-speed buffer memory to the DRAM device, update the page table based on the target data being moved to the DRAM device.

16. A method of operating a host that is configured to control a storage module comprising a dynamic random access memory (DRAM) device and a nonvolatile memory device, the method comprising:
entering a page fault mode when target data is absent from the DRAM device;
changing a refresh reference time from a first reference time to a second reference time in response to entering the page fault mode, the second reference time being longer than the first reference time;
transmitting a refresh command to the storage module; and
providing a valid command to the storage module after the second reference time elapses from a time point when the refresh command is transmitted.

17. The method of claim 16, further comprising:
changing the refresh reference time from the second reference time to the first reference time after the second reference time elapses from the time point when the refresh command is transmitted.

18. The method of claim 16, wherein the target data is a first target data, the method further comprising:
determining a hit ratio associated with second target data in the storage module; and
changing the refresh reference time from the second reference time to the first reference time when the hit ratio is not less than a reference value.

19. The method of claim 16, wherein the first reference time is a minimum time required for the DRAM device to perform a refresh operation.

* * * * *